US008364832B2

(12) United States Patent
Li

(10) Patent No.: US 8,364,832 B2
(45) Date of Patent: Jan. 29, 2013

(54) DATA SEGREGATION AND FRAGMENTATION IN A WIRELESS NETWORK FOR IMPROVING VIDEO PERFORMANCE

(75) Inventor: Pen Li, San Jose, CA (US)

(73) Assignee: NXP B.V., Eindhoven (NL)

( * ) Notice: Subject to any disclaimer, the term of this patent is extended or adjusted under 35 U.S.C. 154(b) by 1349 days.

(21) Appl. No.: 10/569,016

(22) PCT Filed: Aug. 26, 2004

(86) PCT No.: PCT/IB2004/051567
§ 371 (c)(1),
(2), (4) Date: Nov. 16, 2006

(87) PCT Pub. No.: WO2005/020510
PCT Pub. Date: Mar. 3, 2005

(65) Prior Publication Data
US 2007/0140291 A1    Jun. 21, 2007

Related U.S. Application Data

(60) Provisional application No. 60/497,995, filed on Aug. 26, 2003.

(51) Int. Cl.
*G06F 15/16* (2006.01)

(52) U.S. Cl. ...................................................... 709/230

(58) Field of Classification Search ................... 709/230
See application file for complete search history.

(56) References Cited

U.S. PATENT DOCUMENTS

| 7,606,155 | B2 * | 10/2009 | Higashida | 370/235 |
| 2002/0056125 | A1 * | 5/2002 | Hodge et al. | 725/87 |
| 2007/0086484 | A1 * | 4/2007 | Quigley et al. | 370/468 |
| 2008/0005246 | A1 * | 1/2008 | VanBuskirk et al. | 709/204 |

FOREIGN PATENT DOCUMENTS

| EP | 1 225 736 | 7/2002 |
| JP | 11-252114 A | 9/1999 |
| WO | WO 95/12265 | 5/1995 |
| WO | 99/05602 A1 | 2/1999 |

OTHER PUBLICATIONS

Ranasinge, R. et al. "Scheduling Disciplines for Multimedia WLANs: Embedded Round Robin and Wireless Dual Queue", IEEE Conf. on Comms., vol. 1 of 10, pp. 1243-1248 (2001).
Nguyen, G. et al. "A Trace-Based Approach for Modeling Wireless Channel Behavior", Proc. of the 1996 Winter Simulation Conf., pp. 597-604 (1996).
English translation of Office Action in Japanese patent appln. 2006-524520 (Nov. 17, 2009).
International Preliminary Report on Patentability for Int'l patent appln. PCT/IB2004/051567 (Feb. 27, 2006).

* cited by examiner

Primary Examiner — Hussein Elchanti
Assistant Examiner — Maceeh Anwari

(57) ABSTRACT

A wireless communication device comprises an input terminal configured to communicate data with a processor. A segregation circuit (150) is coupled to the input terminal and configured to identify predetermined data and to separate more important data from less important data. A memory (112) is configured to store at least one parameter relevant to the wireless communication protocol. A modem (110) is coupled to segregation circuit and the memory (112) and is configured to communicate using a wireless protocol over a wireless channel, and includes a framer (152) configured to fragment the segregated data based at least in part on the at least one parameter stored in the memory. In one aspect of the invention, the wireless protocol is 802.11. Advantages of the invention include the ability to achieve high quality video communication over a wireless communication link with less chance of dropping important data.

18 Claims, 3 Drawing Sheets

DATA SEGREGATION AND FRAGMENTATION IN A WIRELESS NETWORK FOR IMPROVING VIDEO PERFORMANCE

CROSS REFERENCE TO RELATED APPLICATION

This application claims the benefit of U.S. provisional application Ser. No. 60/497,995 filed Aug. 26, 2003, which is incorporated herein whole by reference.

The present invention relates to communications in a wireless network. In particular, the invention related to data segregation and fragmentation in a wireless network for improving the performance of video communication.

Wireless communications are becoming very popular because allow users to move freely without being tied to a desk or wire. However, users are continually demanding greater performance and better communication with their wireless devices. Consequently, techniques that improve the performance of wireless devices are extremely useful and may have great commercial value. One aspect that can be improved has to do with the way messages are fragmented so that they may be efficiently communicated between devices.

In wireless communication standards such as 802.11 Wireless Local Area Network (WLAN) standard, a technique called fragmentation divides large messages into smaller fragments so that they can be transmitted efficiently between devices. Ordinarily, the fragment length is fixed, however, the longer the fragments the more likely that they will be corrupted during the communication. On the other hand, the smaller fragmentation length means larger overhead and more transmit and acknowledge (ACK) rounds which will decrease the system throughput. So if the channel condition is good, the longer fragment length will increase the system throughput. Some techniques for manually modifying the fragment size or for dynamically modifying the fragment size are known in the art, but they do not adequately take into account certain channel parameters and variables that would be useful for optimizing the fragment length.

In the 802.11 specification FIG. 1 is provided to show the standard fragmentation process of partitioning a media access control (MAC) service data unit (MSDU) into smaller MAC level frames, MAC protocol data units (MPDUs). Fragmentation creates MPDUs smaller than the original MSDU length to increase reliability, by increasing the probability of successful transmission of the MSDU or MMPDU in cases where channel characteristics limit reception reliability for longer frames.

As described above, the conventional fragmentation technique applies the same fragmentation threshold to all data packet regardless of their importance. What is needed is a technique for identifying the data so that more important data packets can be segregated from less important data packets. The invention is directed to a technique for segregating such data, especially under the 802.11 WLAN standard.

The present invention addresses the identified problems and provides a wireless communication device with a segregation circuit, especially applied to video data under the 802.11 Wireless Local Area Network (WLAN) standard. This segregation allows the wireless communication device to achieve an increased quality of video communication and reception over the wireless communication channel.

A wireless communication device comprises an input terminal configured to communicate data with a processor. A segregation circuit is coupled to the input terminal and configured to identify predetermined data and to separate more important data from less important data. A memory is configured to store at least one parameter relevant to the wireless communication protocol. A modem is coupled to segregation circuit and the memory and is configured to communicate using a wireless protocol over a wireless channel, and includes a framer configured to fragment the segregated data based at least in part on the at least one parameter stored in the memory. In one aspect of the invention, the wireless protocol is 802.11. Advantages of the invention include the ability to achieve high quality video communication over a wireless communication link with less chance of dropping important data.

In one aspect of the invention, the memory is configured to store a fragmentation threshold parameter, which is set to be greater than the segregation circuit allocates for more important data. The framer is configured to fragment the segregated data based at least in part of the fragmentation threshold parameter.

In one aspect of the invention, the predetermined data is video data and the more important data is the video control data and the less important data is the video payload data. In one aspect of the invention, the video data is MPEG-2 format video data.

Advantages of the invention include the ability to achieve high quality video communication over a wireless communication link with less chance of dropping important data.

The invention will be described with reference to the following figures in which.

The invention is described with reference to a number of embodiments, which may include specific implementations. The invention is intended to describe the best mode of the invention, but other similar techniques and technologies can be used to perform the invention. For example, reference is made to the 802.11 Wireless Local Area Network (WLAN) protocol, but other protocols may be implemented in the invention. Likewise, while reference is made to a segregation circuit for segregating more important data from less important data, the invention can also be performed in software by a processor or other device.

A. FRAGMENTATION USING WIRELESS PROTOCOL STANDARD (802.11)

Figure 1:
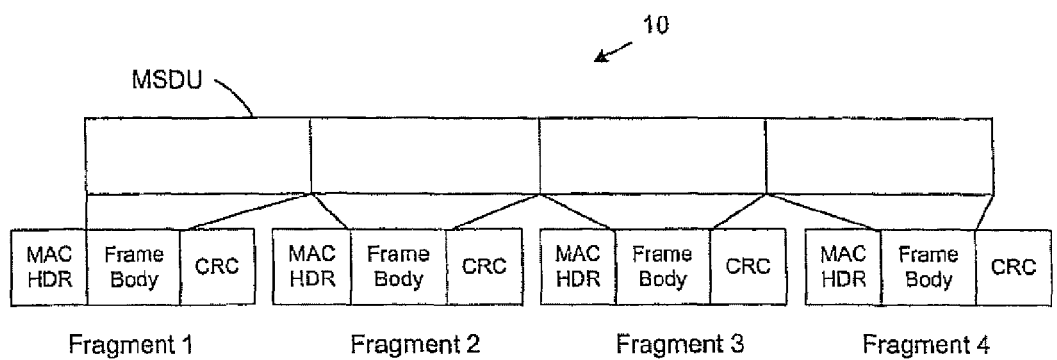
FIG. 1 is a diagram showing fragmentation under the 802.11 communication protocol specification.

As shown in FIG. 1, a media access control (MAC) device may fragment and reassemble directed MAC service data units (MSDUs) or MAC management protocol data units (MMPDUs). Each of these fragments in referred to as a frame in communication between the wireless devices. Fragmentation is described in detail in the 802.11 specification, which is available on the Internet at the IEEE web site, http://www.ieee.org. While the specification describes standard techniques for performing fragmentation based on a fragmentation threshold, it does not teach or suggest techniques for improving certain types of communication performance by segregating more important data and less important data as described herein.

Figure 2:
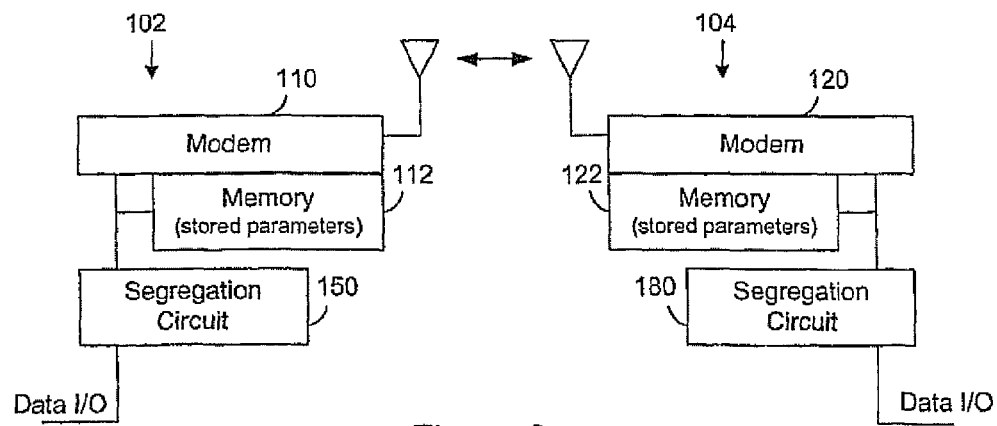
FIG. 2 is a simplified block diagram showing two wireless devices using an exemplary 802.11 communication protocol according to an embodiment of the invention.

FIG. 2 is a simplified block diagram showing two wireless devices 102 and 104 using an exemplary 802.11 communication protocol according to an embodiment of the invention. The exemplary devices 102 and 104 are the same so reference is made to one of the devices, e.g. 102. A modem 110 is constructed that is coupled to a memory 112 for storing communication parameters, for example a fragmentation threshold. In at least one embodiment, the fragmentation threshold can be modified by the modem, a processor or other means, but such modification is not required by the invention. A segregation circuit 150 is coupled between the modem and the Data I/O terminal. The segregation circuit performs functions described below to separate important data from less important data. While the segregation circuit is shown as positioned between the modem and the Data I/O terminal, in the exemplary embodiment of the invention, the segregation circuit only affects the input data, which is sent to the modem to be transmitted over the wireless protocol.

Figure 3:
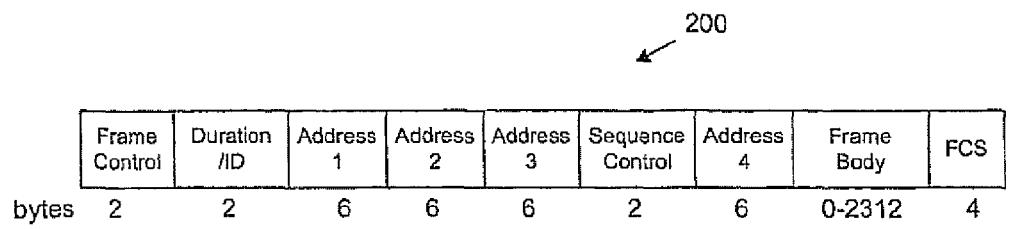
FIG. 3 is an exemplary wireless frame according to the 802.11 specification.

FIG. 3 is an exemplary wireless frame 200 according to the 802.11 specification, where the frame represents one of the fragments as described above. The modem 110 performs the fragmentation and constructs the frame including the frame body, which can be 0-2312 bytes long, depending on the fragmentation threshold stored in the memory 112.

B. SEGREGATION AND FRAGMENTATION

Figure 4:
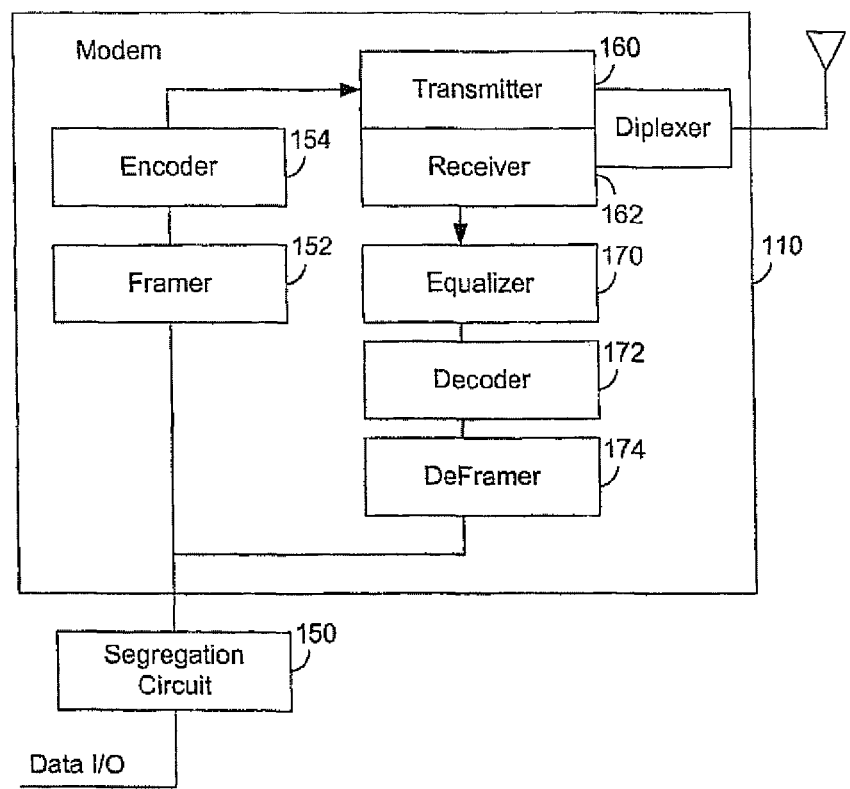
FIG. 4 is a diagram showing an internal functional block diagram of the modem according to an embodiment of the invention.

FIG. 4 is a diagram showing an internal functional block diagram of the modem according to an embodiment of the invention. The modem 110 includes a number of components, for example, a transmitter 160 and receiver 162. In addition, the modem includes a framer 152. As described above, the framer typically applies the same fragmentation threshold to all data uniformly. The invention further includes a segregation circuit 150 outside the modem 110 to segregate more important data from less important data based on the type of data.

In an exemplary embodiment, the predetermined data is video data, and specifically MPEG-2 data. The segregation circuit 150 is configured to identify the MPEG-2 data and to separate the more important control data from the less important payload data as described below.

In a preferred embodiment, the fragmentation threshold parameter stored in the memory is greater than the length of the important control data. In this manner, when the framer fragments the segregated data based on the fragmentation threshold parameter, the important data is not fragmented and has a greater chance of being received properly by the receiver. In most applications, the control data is significantly shorter than the fragmentation threshold, and therefore, will have significantly higher chance of being properly received as compared to less important data that is fragmented at the full length of the fragmentation threshold.

Figure 5:
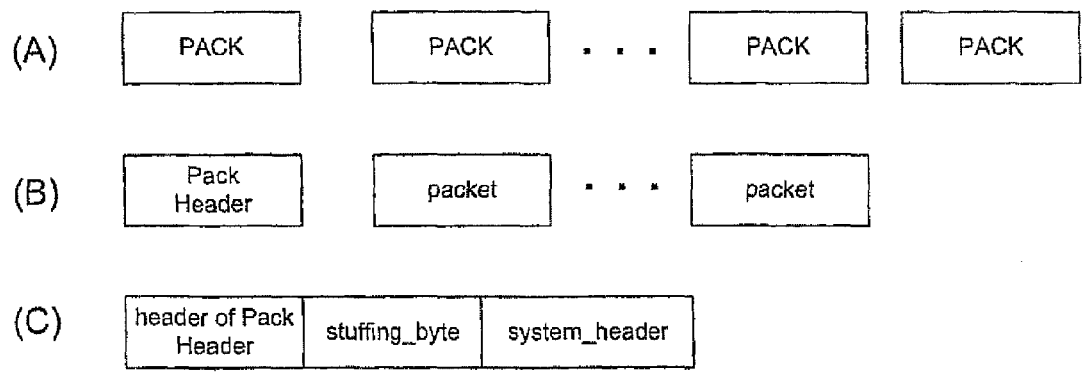
FIG. 5 is a diagram showing a data packets for a video application aspect of the invention.

FIG. 5 is a diagram showing a data packets for a video application aspect of the invention. An exemplary MPEG-2 program stream is shown, which has two functions. One is to pack the MPEG-2 Program Stream into transport formats according to the requirements of different OSI seven layers such as RTP, RCP, IP and others. The other function is to ensure that when packed into MSDU format, the PACK Header will exist solely in one MSDU rather than coexisting with the rest of the packets.

C. METHOD OF OPERATION

Figure 6:
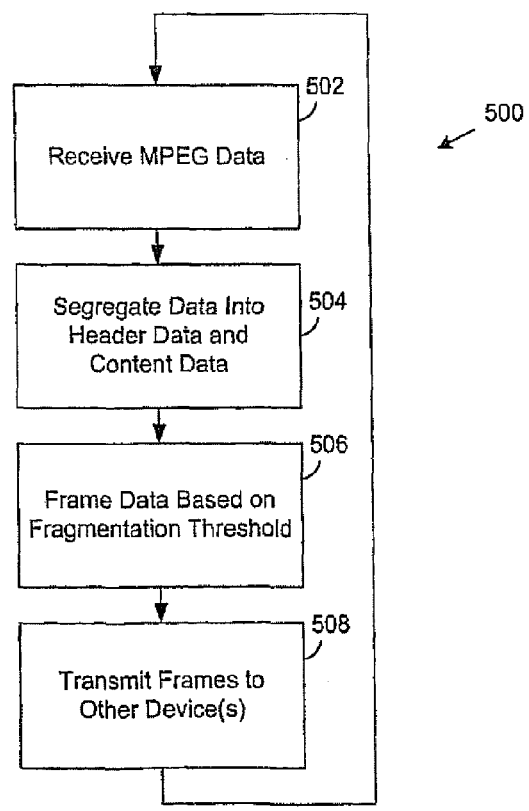
FIG. 6 is a flowchart showing the inventive operating steps according to an embodiment of the invention.

FIG. 6 is a flowchart showing the inventive operating steps according to an embodiment of the invention. In step 502, the modem receives video data (e.g. MPEG data) and identifies it as one of the classes of predetermined data which will be segregated by the segregation circuit. In step 504, the segregation circuit segregates the data into more important data (e.g. control data) and less important data (e.g. payload data). In step 506, the framer frames the segregated data based on at least one parameter stored in memory (e.g. the fragmentation threshold). In step 508, the modem transmits the data to other device(s) using the wireless protocol over the wireless link.

D. CONCLUSION

Advantages of the invention include the ability to achieve high quality video communication over a wireless communication link with less chance of dropping important data.

Having disclosed exemplary embodiments and the best mode, modifications and variations may be made to the disclosed embodiments while remaining within the subject and spirit of the invention as defined by the following claims.

What is claimed is:

1. A wireless communication device comprising:
   an input terminal that communicates data with a processor;
   a segregation circuit, coupled to the input terminal, that identifies predetermined data and separates incoming high-priority data from incoming low-priority data to produce segregated data;
   a memory that stores a parameter relevant to the wireless communication protocol; and
   a framer, coupled to the segregation circuit and the memory, that fragments the segregated data based at least in part on the stored parameter; and wherein the memory stores a fragmentation threshold parameter that is set to be greater than the length of the incoming high-priority data and less than the length of the incoming low-priority data and the framer frames the segregated data based at least in part of the fragmentation threshold parameter.

2. The wireless communication device of claim 1, wherein the predetermined data is video data, the high-priority data is video control data, and the low-priority data is video payload data.

3. The wireless communication device of claim 2, wherein the video data are Moving Picture Experts Group-2 (MPEG-2) format video data.

4. The wireless communication device of claim 3, wherein the segregation circuit is configured to identify the MPEG-2 format video data.

5. The wireless communication device of claim 1, wherein the predetermined data is video data, the high-priority data is video control data, and the low-priority data is video payload data.

6. The wireless communication device of claim 5, wherein the video data are Moving Picture Experts Group-2 (MPEG-2) format video data.

7. The wireless communication device of claim 6, wherein the segregation circuit is configured to identify the MPEG-2 format video data.

8. The wireless communication device of claim 1, wherein the segregation circuit is outside of a modem.

9. The wireless communication device of claim 1, wherein the segregation circuit is coupled between a modem and a data input/output (I/O) terminal.

10. The wireless communication device of claim 1, wherein the segregation circuit only operates on input data.

11. A method of communicating between wireless modems using a wireless communication protocol, comprising:

storing a parameter relevant to the wireless communication protocol;

identifying, by a segregation circuit, predetermined data;

separating, by the segregation circuit, incoming high-priority data from incoming low-priority data to produce segregated data;

framing the segregated data based at least in part on the stored parameter; and communicating the framed data using the wireless communication protocol over a wireless channel; and setting a fragmentation threshold parameter to be greater than the length of the incoming high-priority data and less than the length of the incoming low-priority data, wherein the parameter comprises the fragmentation threshold parameter; and framing the segregated data based at least in part on the fragmentation threshold parameter.

12. The method of claim 11, wherein the identifying step further comprises:

identifying video data; and segregating the video data, wherein video control data are high-priority data and video payload data are low-priority data.

13. The method of claim 12, wherein the video data are Moving Picture Experts Group-2 (MPEG-2) format video data.

14. The method of claim 13, wherein the segregation circuit is configured to identify the MPEG-2 format video data.

15. The method of claim 11, wherein the identifying step further comprises:

identifying video data; and segregating the video data, wherein video control data are high-priority data and video payload data are low-priority data.

16. The method of claim 15, wherein the video data are Moving Picture Experts Group-2 (MPEG-2) format video data.

17. The method of claim 16, wherein the segregation circuit is configured to identify the MPEG-2 format video data.

18. The method of claim 11, further comprising: modifying, by a processor, the fragmentation threshold parameter.

* * * * *